(No Model.) 2 Sheets—Sheet 2.
L. D. BENNER.
CHECK ROW ATTACHMENT FOR CORN PLANTERS.
No. 267,054. Patented Nov. 7, 1882.
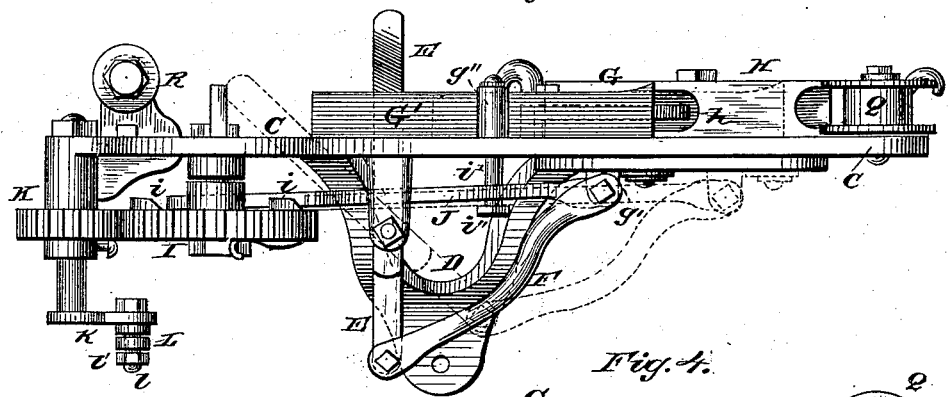
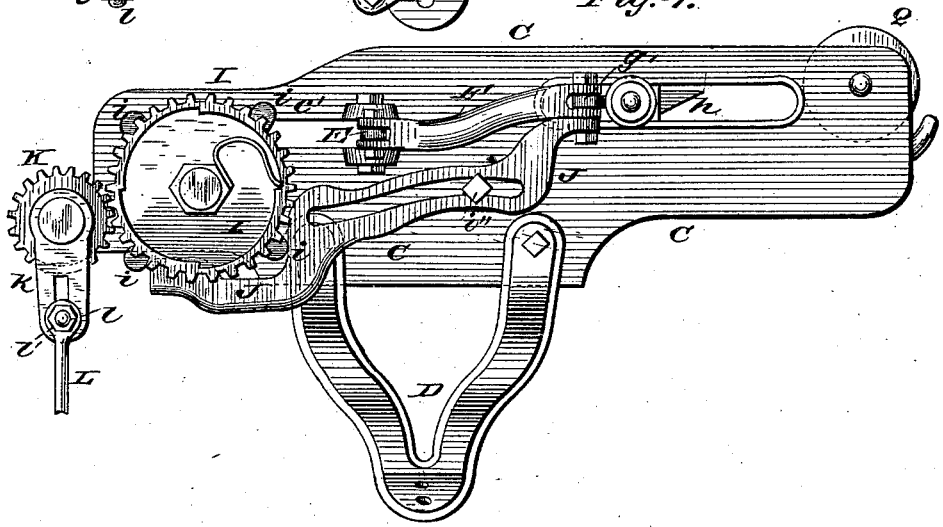
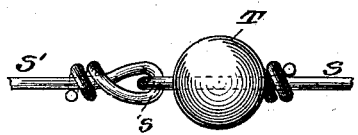
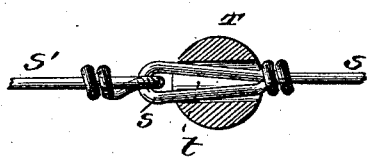
WITNESSES
INVENTOR
Lorenzo D. Benner
by W. B. Richards Attorney

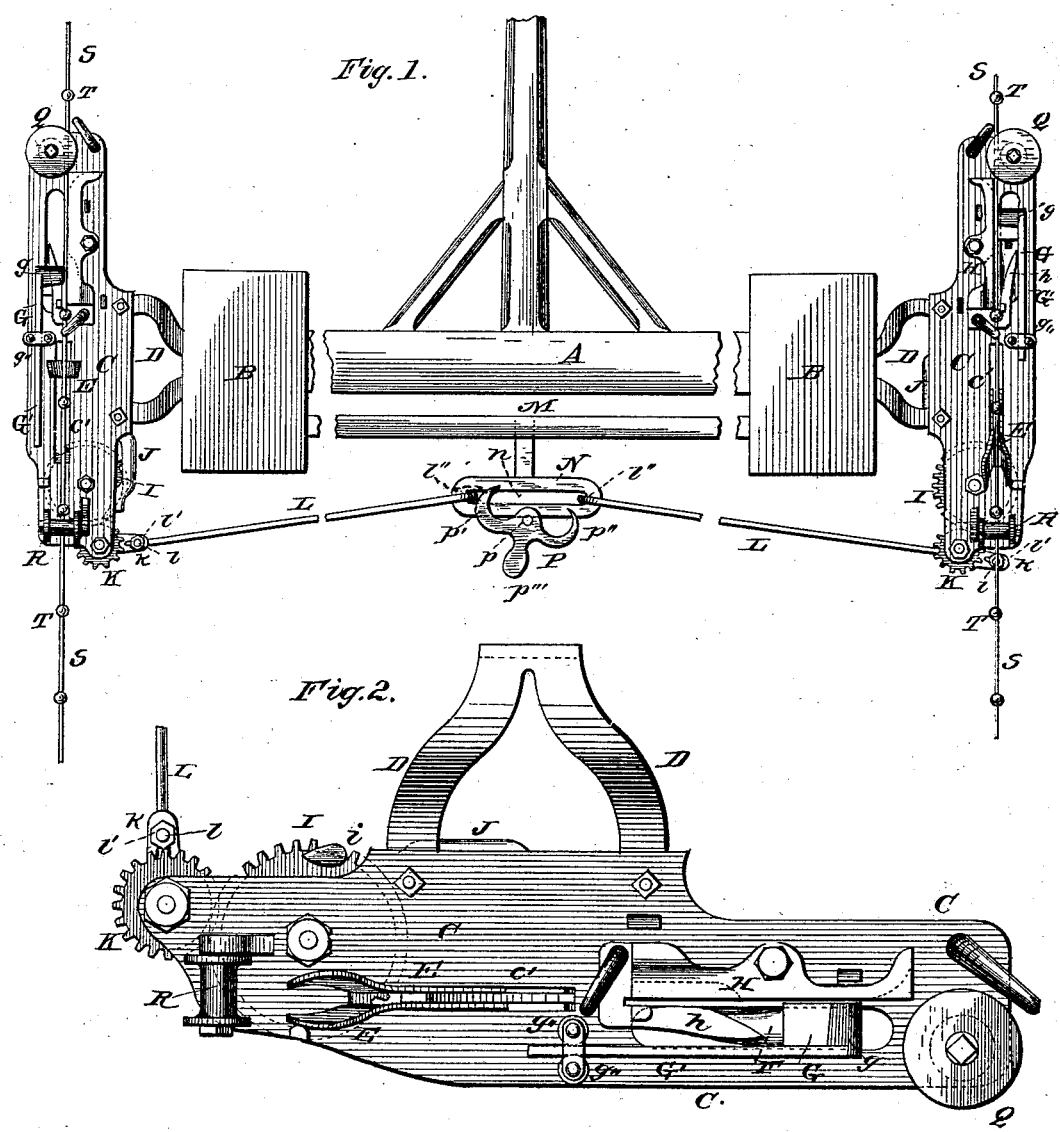

UNITED STATES PATENT OFFICE.

LORENZO D. BENNER, OF GALESBURG, ILLINOIS, ASSIGNOR TO GEORGE C. ALDEN AND ALONZO C. CLAY, BOTH OF SAME PLACE.

CHECK-ROW ATTACHMENT FOR CORN-PLANTERS.

SPECIFICATION forming part of Letters Patent No. 267,054, dated November 7, 1882.

Application filed August 3, 1881. Renewed June 10, 1882. (No model.)

*To all whom it may concern:*

Be it known that I, LORENZO D. BENNER, a citizen of the United States, residing at Galesburg, in the county of Knox and State of Illinois, have invented certain new and useful Improvements in Check-Row Attachments to Corn-Planters; and I do hereby declare the following to be a full, clear, and exact description of the invention, such as will enable others skilled in the art to which it appertains to make and use the same, reference being had the accompanying drawings, and to letters or figures of reference marked thereon, which form a part of this specification.

The invention herein described relates to that class of check-row attachments to corn-planters in which the attachments are adapted to actuate the seed-slides of the planter, and to be actuated by a knotted wire or cord stretched across the ground to be planted; and the improvements consist in constructions and combinations hereinafter described, and set forth in the claims hereto annexed.

In the accompanying drawings, which illustrate my invention, and in which the similar letters used as marks of reference apply to the like parts in all of the figures, Figure 1 is a top plan of the forward part of an ordinary two-row corn-planter with my check-row attachments in place thereon. Fig. 2 is an enlarged top plan of one of the check-row heads. Fig. 3 is a side elevation of the parts shown at Fig. 2. Fig. 4 is a plan of the parts shown at Fig. 2, seen from below. Fig. 5 is a plan of a knot and a short section of wire adjacent thereto. Fig. 6 is a sectional elevation of the knot shown at Fig. 4 with the wire therein.

Referring to the drawings by letters, letter A represents the forward frame of an ordinary two-row corn-planter, with ordinary seed-boxes, B B.

Letter C represents the base-plate, to which the working parts of my improvement are attached. One of the plates C is shown attached to the planter near each seed-box by a bracket, D, but may be attached in any other manner desired.

E is a lever hinged or journaled at its mid-length portion to standards $c$, which project downward from the base-plate C. The upper end of the lever E is forked in the ordinary manner, and extends upward through a slot, $c'$, in the plate C, and its lower end is hinged to a connecting-rod, F, the other end of which is hinged to a stud, $g$, which projects downward through a slot in the plate C from a sliding head, G. The sliding head G is constructed with projections $g$, similar to the sliding head C shown and described in Letters Patent No 239,596, granted to me April 5, 1881, and need not be described here further than to observe that it is held in alignment in the present case by the stud $g'$ and by a guide-roller, $g''$, on each side of its main stem G'.

H is a block with a cam, $h$, on its face next the head G. The block H and cam $h$ are similar to the block D and cam E in my Patent No. 239,596, except that in the present case the block H is fixed and does not oscillate as in said patent.

I is a pinion-wheel journaled to and below the plate C, and has lugs $i$ on its upper surface.

J is a tappet-arm pivoted or hinged at one end to the stud $g$, and held up at its other end by a stud, $i'$, which is pendent from the plate C. The stud $i'$ passes through a slot in the arm J, and has a head, $i''$, which sustains the free end of the arm J, but permits it to rise, as shown by dotted lines at Fig. 3.

K is a pinion gearing with the pinion I, and carries a crank-arm, $k$. The pinion K is adapted to rotate a half-revolution at each quarter-revolution of the pinion I.

L is a rod journaled at one end to a stud-bolt, $l$, which is adjustably secured in a slot in the crank-arm $k$ by a nut, $l'$. The bolt $l$ may be adjusted in the slotted arm $k$ to give more or less throw to the rod L, and thereby any desired throw to the seed-slides. A rod, L, extends from each head C to the ordinary slide-bar, M, which connects and by its reciprocating movement gives motion to the seed-slides of the planter. The adjacent ends of the rods L have each a hook, $l''$, thereon, which engage in a slot, $n$, in a bracket, N, that projects from the slide-bar M.

P is a locking-plate pivoted at $p$ to the bracket N, and has detent-arms $p'$ $p''$ and a handle-arm, $p'''$. When the knotted wire is acting on the head at the left-hand side of the planter, as shown at Fig. 1, then the lock P may be turned, as shown at same figure, so that the detent $p'$ will hold the hook on one rod L at the left-hand end of the slot $n$, and will release the other rod L from the detent $p''$, as shown at same figure, and thereby allow the rod L at the left-hand side of the planter to move the bar M and seed-slides, while the slot $n$ slides freely on the hook end of the other rod L without imparting any movement to said rod or to the check-row devices at the right-hand side of the machine. When the knotted wire is acting on the check-row devices at the right-hand side of the machine, then the locking-plate P may be turned to engage its detent $p''$ with the hook-rod L on the right-hand side of the planter, so that it will give motion to the slide-bar M while the other bar L remains stationary.

It will be evident that other locking devices than the one P, which I have shown and described, may be used to engage the check-row devices at one side of the planter with the seed-slide-operating bar while the check-row devices at the other side of the planter are released, so that they will not be moved at the same time. Hence I do not limit my claim on this feature of my invention to the special devices shown.

Q R are ordinary guide-pulleys, and S is a wire chain with knots T at regular intervals equal to the desired distances between the hills of corn to be planted. The knots T are attached as follows: The end of one section, S, of wire is bent back upon itself and passed through a hole, $t$, in the knot T, and then its end coiled upon itself, as shown at Fig. 5. The end of the other section of wire, S', is then passed through the projecting loop $s$ of the first-named section, and a slightly-enlarged loop, $s'$, formed thereon, which prevents the loop $s$ being withdrawn through the hole in the knot T. The section S' is then secured by coiling its end upon itself, as shown at Figs. 5 and 6.

In operation the planter is drawn along the previously-stretched wire in the ordinary manner, and, as shown at the left-hand side of the planter at Fig. 1, the knot T on the wire chain will strike the projections $g$ on the head G, and carry the head G back, and thereby force the tappet-arm J against one of the lugs $i$ on the pinion I, and thereby give a quarter of a revolution to said pinion I, which will in turn give a half-revolution to the pinion K and a motion to the slide-bar M. The head G in moving backward, as last described, will by means of the arm F throw the lever E forward, as shown by dotted lines at Fig. 3, so that when the knot escapes from the lugs $g$ it will strike the forked end of the lever E, and force it backward until by the inclination of the lever the knot escapes. The lever E in moving backward at its upper end, as last described, will throw its lower end forward, and by means of the arm F, which is connected therewith, will force the head G back again to the position shown by full lines at Fig. 1, and ready for the action of the next knot. It will then be seen that each knot first acts upon the head G to actuate the seeding devices, and then acts upon the lever E to return the head G for the action of the next knot, and that when the knot acts upon the forked lever E the tappet-arm is moved backward without acting upon the pinion I. The crank-arm $k$ at the end of each throw stands in line with the rod L, or on its "dead-point", and thus forms a lock to prohibit movement of the seed-slides from jarring or tilting of the planter.

What I claim as new is—

1. In combination with the knotted-wire chain, and with a sliding head on which each knot of the chain acts to impart a movement to the seed-slides, a forked lever adapted to be acted on by each knot after it acts upon the sliding head, and to return the sliding head to its proper position for the action of the next knot.

2. In combination with a sliding head upon which the knots on the wire chain act to give it motion, a tappet-arm, J, adapted to give an intermittent rotary motion in one direction to the pinion I, substantially as and for the purpose specified.

3. In combination with the sliding head G, sliding arm J, and pinion I, having lugs $i$, adapted to receive an intermittent rotary motion in one direction from the arm J, the lever E, and arm F, adapted to restore the sliding head G to its normal position, substantially as and for the purpose specified.

4. The crank-pinion K, in combination with the pinion I, having lugs $i$, rod L, tappet-arm J, head G, lever E, and rod F, substantially as and for the purpose specified.

5. In combination with the sliding head G and knotted check-row chain, the lever E, pivoted as described, and connected at one end with head G by a rod, F, substantially as and for the purpose specified.

6. In combination with a rod, L, adapted to give motion to the seed-slides of a planter, a crank adapted to receive motion from a knotted cord or wire, and which stops at its dead-points at the end of each of its throws, and thereby forms a lock for the planter seed-slides, substantially as and for the purpose specified.

7. In combination with the slide-bar which operates the seed-slides of a corn-planter, and with rods L, which transmit motion from the check-row devices to said slide-bar, a lock or catch adapted to lock one rod L in contact with said slide-bar for the purpose of operating it without imparting movement to the check-row devices on the opposite side of the planter from the rod L which is actuating the seed-slide bar.

8. In combination with the bar M and rods L, the catch or lock P, adapted to engage one bar L with the bar M while the other is left free, substantially as and for the purpose specified.

9. In a check-row chain, the knot secured to the chain by a loop on one section of the chain passed through the knot and coiled upon itself, and the end of the other section interlocked therewith and coiled upon itself, substantially as and for the purpose specified.

10. The combination, in a check-row wire chain, of knots, T, having holes through them, with sections of wire S, each of which is looped at one end, and said loop passed through the hole in the knot, and the end of the wire coiled upon itself to retain the knot in place on the wire, substantially as and for the purpose specified.

11. In a check-row wire chain, in combination with the wire sections S S', the knot secured to the chain by a loop on one section of wire passed through the knot, and its end coiled upon the main portion of the section, and the end of the other section interlocked therewith and coiled upon itself, substantially as and for the purpose specified.

In testimony whereof I affix my signature in presence of two witnesses.

LORENZO D. BENNER.

Witnesses:
F. C. SMITH,
M. ANDREWS.